United States Patent [19]
Maya et al.

[11] Patent Number: 5,541,477
[45] Date of Patent: Jul. 30, 1996

[54] SELF BALLASTED COMPACT FLUORESCENT LAMP

[75] Inventors: Jakob Maya, Brookline; Dominic Barbuto, Framingham, both of Mass.

[73] Assignee: Matsushita Electric Works R&D Laboratory, Inc., Woburn, Mass.

[21] Appl. No.: 346,744

[22] Filed: Nov. 30, 1994

[51] Int. Cl.$^6$ .............................. H01J 61/30; H01J 17/16
[52] U.S. Cl. ...................... 313/493; 313/634; 313/113; 313/11; 362/216; 362/221
[58] Field of Search ................... 313/485, 493, 313/634, 113, 11, 45, 46; 315/DIG. 5; 362/216, 221, 293

[56] References Cited

U.S. PATENT DOCUMENTS

| | | | |
|---|---|---|---|
| 3,953,761 | 4/1976 | Giudice | 362/216 |
| 4,571,526 | 2/1986 | Wesselink | 313/493 |
| 4,881,007 | 11/1989 | Egelstam | 313/493 |
| 5,086,249 | 2/1992 | Blaisdell et al. | 313/493 |

*Primary Examiner*—Nimeshkumar D. Patel
*Attorney, Agent, or Firm*—Jerry Cohen

[57] ABSTRACT

An elongated arc tube is folded into multiple parallel legs in a close packed peripheral array about a long, thin ballast housing, the combination constituting a retrofittable incandescent bulb replacement compact flourescent having a shorter overall length and a more uniform spatial light distribution.

5 Claims, 4 Drawing Sheets

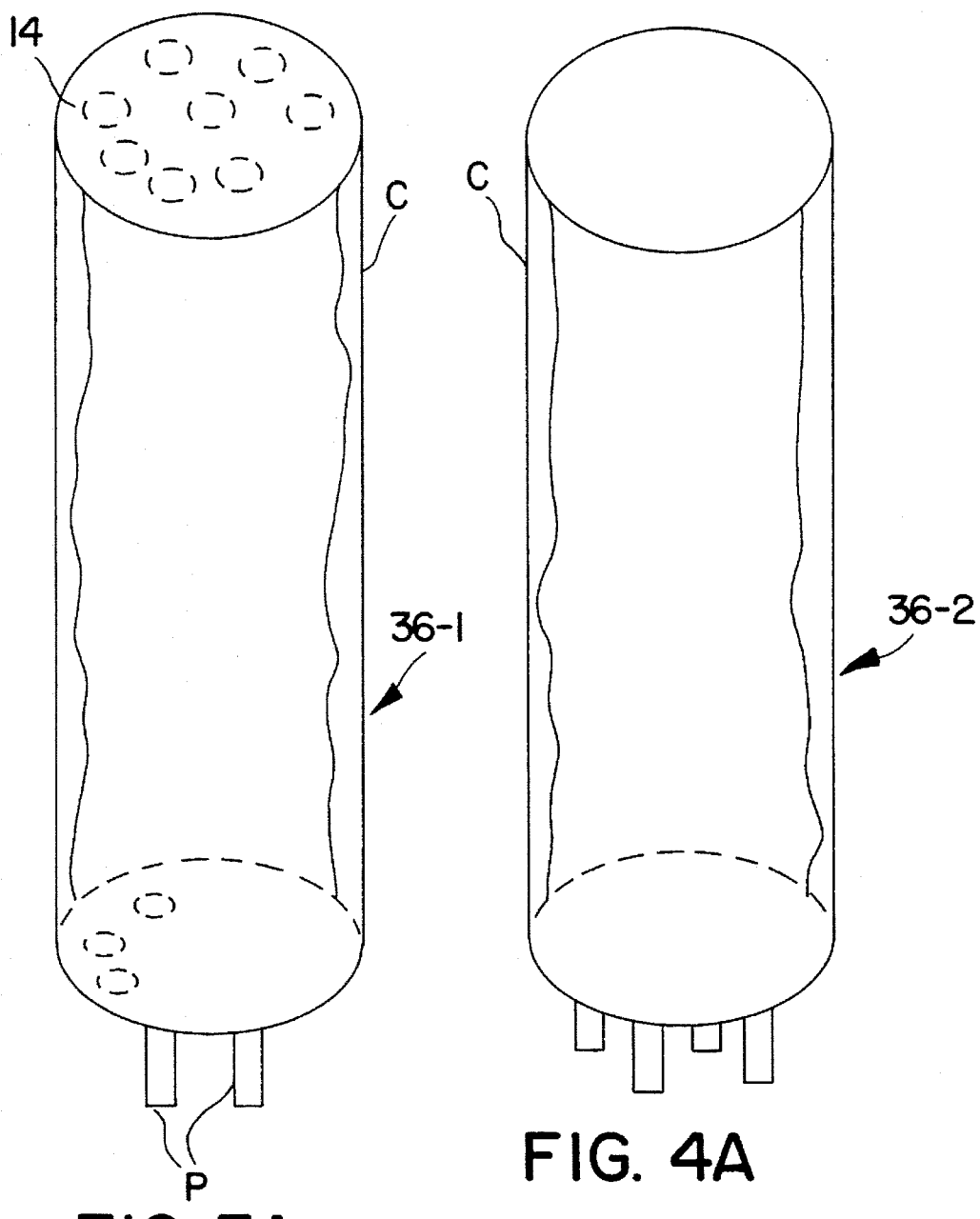
FIG. 3A
FIG. 4A
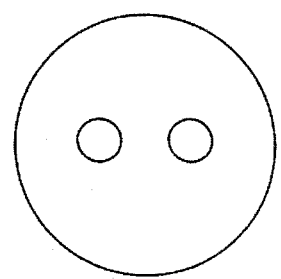
FIG. 3B
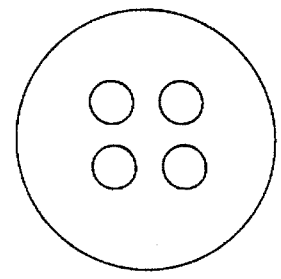
FIG. 4B

SELF BALLASTED COMPACT FLUORESCENT LAMP

FIELD OF THE INVENTION

The field of the invention relates to a fluorescent lamp, and more particularly to a fluorescent lamp that is compact, is electronically self ballasted, has a higher lumen output for the package size, and can be utilized for an incandescent retrofit, thereby saving energy.

BACKGROUND OF THE INVENTION

Compact fluorescent lamps (CFLs) are fluorescent lamps that have been folded several times, allowing them to fit into a smaller space. This allows them access to the market which was previously the exclusive domain of incandescent lamps (ILs). The CFLs are desirable replacements for ILs primarily because they are more efficient light sources. Today, the range of power and light output of CFLs is 5 to 55 W with 250 to 4800 lumens.

CFLS are comprised of a glass envelope with a phosphor coating on its interior surface. Each end of the lamp has an oxide coated electrode, the oxide coating serving to enhance electron emission. The glass envelope, during operation, has about a six millitort vapor of mercury (Hg) and several Torr of a rare gas, e.g., argon (Ar). A low pressure discharge is maintained between the two electrodes, causing the Hg to emit ultraviolet (UV) radiation. The radiation is converted to visible light by the phosphor coating.

As indicated above, CPLs are much more efficient at converting electrical energy to visible light than ILs. Typically, a CPL delivers 50 to 60 lumens per watt (LPW), while the efficiency of an IL is 16 LPW. Thus, replacement of ILs with CPLs yields substantial energy savings. Furthermore, ILs have a lifetime of only about 750 hours, while CFLs last from 6,000 to 10,000 hours. In commercial venues, where replacement of light bulbs involves labor costs, the less often a bulb needs to be changed the more economical the installation. Finally, the electric utilities desire to reduce the peak load demand by supporting energy conservation. Building additional power generating facilities or running less efficient auxiliary generators to accommodate the peak load is costly. Therefore, utilities have found it more economical to support energy saving devices to reduce peak load. This is called Demand Side Management, or DSM. These DSM programs have given a large boost to the entire field of CFLs.

Reducing the size of CFLs to expand their applicability is a goal of the lighting industry, but the problems of thermal management become increasingly prohibitive as the dimensions of the lamp shrink. The performance of CFLs is strongly dependent upon the Hg pressure in the lamp, which increases with temperature. With a typical ambient temperature of 25° C., some of the heat generated by the discharge beneficially warms the cold spot to the ideal temperature of 40° C. At this temperature, the vapor pressure of Hg delivers the maximum UV radiation to the phosphor coated walls. Standard fluorescent lamps (FLs) have been engineered to operate at the ideal temperature. But the domain of CFLs is in compact applications. Therefore, to attain the desired luminous flux from a CFL while maintaining its compactness requires that the wall loading, or power per unit surface area, be increased over that from standard FLs. This causes the cold spot temperature of the CFLs to rise beyond the ideal of 40° C., and the efficiency of the lamp drops.

This problem can be solved by either of two methods. A region of the glass envelope can be cooled by changing its geometry or by heat sinking it. Because the Hg vapor fills the entire volume of the glass envelope, cooling any small portion of that envelope will effectively control the Hg pressure anywhere in the lamp. This method has the disadvantage of constraining the possible geometries available to the lamp designer. Furthermore, application of the CFL in a fixture may obviate advantages gained by altering the geometry. The other solution is to use an amalgam of Hg and indium, which has a lower vapor pressure than Hg itself.[1] Without an amalgam, the efficiency of a CFL is within 10% of its optimum over a narrow 25° C. range centered at 40° C. With an amalgam, that range is shifted to higher temperatures, specifically tailored to those encountered in a CFL, and the efficiency is within 10% of its optimum over a range of 40° C.–120 C. This makes the lamp both efficient at the nominal operating temperature of the lamp and makes it insensitive to departures from the specified operating temperature. Unfortunately, the Hg pressure takes longer to become established because the lamp has a longer warm-up time. This delays the time at which the lamp attains its maximum light output.

[1] J. Hoffman, "Compact, Single Ended Fluorescent Lamp with Fill Vapor Pressure Control", U.S. Pat. No. 4,694,215.

An additional malady resulting from overheating is the degradation of the electronic ballast. The addition of an integral electronic ballast to CFLs expands their applicability, but it also thermally couples the lamp to the electronics. This, and the compactness of the source, causes the temperature of the components to rise and shortens their useful life.

As the size of the CFL is reduced, the phosphor loading (power per unit surface area covered with phosphor) increases, leading to faster phosphor light output deterioration. This is due to the density of damaging species that impinge on the phosphor. Hg+ ions tend to sputter the phosphor and implant themselves, causing darkening, which inhibits the generation and transmittance of visible radiation. High energy radiation can also damage the phosphor. In particular, the 185.0 nm Hg radiation is somewhat damaging. Under normal operating conditions of the CFL lamp, i.e., cold spot temperature of 40° C., the amount of 185.0 nm radiation is only about 6%. However, as the temperature goes up this percentage increases to as much as 20–30% depending on the temperature. Phosphors have been improved so that they can withstand a higher wall loading, yet they remain a weak link in the longevity of CFLs. One method of protecting the phosphor is to coat it with a thin film of alumina.[2,3] This coating is transparent to UV, allowing the UV to strike the phosphor and generate visible light while shielding the phosphor from damaging species.

[2] A. G. Sigai, K. A. Klinedinst "Phosphors with Improved Lumen Output and Lamps Made Therefrom", U.S. Pat. No. 5,309,069. [3] F. R. Taubner, A. G. Sigai, C. Chenot and H. B. Minnier "Method for Preparing Zinc Ortho Silicate Phosphor Particle", U.S. Pat. No. 5,196,234.

Packaging remains a problem for CFLs. They are not a suitable retrofit in many incandescent applications. They do not fit into A19 or A23 dimensions. This is especially true for 100 W incandescent equivalent CFL's. As it turns out, this is a very popular table and reading lamp because of its high lumen value (~1700 lumens). Therefore, a compact, small size 1700 lumen CFL would find many industrial, commercial, and residential applications. Generally, CFLs are shaped as a cluster of 2, 4, 6, or even 8 parallel tubes interconnected to allow one continuous discharge. Or at times they are a series of U shaped tubes. They are perched atop an integral electronic ballast, adding further to their overall length. An incandescent lamp with an E27 cap has an overall length of about 108 mm, whereas a 23 watt/1550 lumen triple-U lamp still has an overall length of 173 mm. This seriously hinders the use of CFLs as retrofit replacements for ILs.

SUMMARY OF THE INVENTION

The principal object of the present invention is to provide a light source which is compact and more comparable to an incandescent light source in size and weight compared to FLs and much more efficient, of course, than an incandescent lamp, more specifically the 100 watt incandescent light bulb.

Yet another object of the present invention is to provide a CFL for incandescent retrofit applications, such CFL to have a good spatial light distribution and a pleasing look, to replace an incandescent bulb in a way that appears aesthetically pleasing.

Yet another object of the present invention is to provide an electronic ballast which is rectangular or cylindrical in shape and could be inserted and removed at will from the light source. In other words, it is a detachable electronic ballast offering the consumer the flexibility of throwing away only the failed part (ballast or light source) rather than the whole package.

Still another object of the present invention is to provide a ballast housing which reflects not only the visible light back to the surroundings thereby minimizing the absorbed visible radiation but also reflects the infrared radiation emanating from the light sources thereby increasing the efficiency of the CFL package and keeping the electronics relatively cool to optimize their performance.

Other objects, features and advantages will be apparent from the following detailed description of preferred embodiments taken in conjunction with the accompanying drawings in which:

BRIEF DESCRIPTION OF THE DRAWINGS

FIGS. 3A, 3B and 4A, 4B are schematic representations (as pseudo-isometric and bottom views) of the elongated, central ballast housing in two pin and four pin versions.

Tables 1-3 described below appear at Appendix A of this application (after the Abstract).

DETAILED DESCRIPTION OF PREFERRED EMBODIMENTS

Figure 1A:
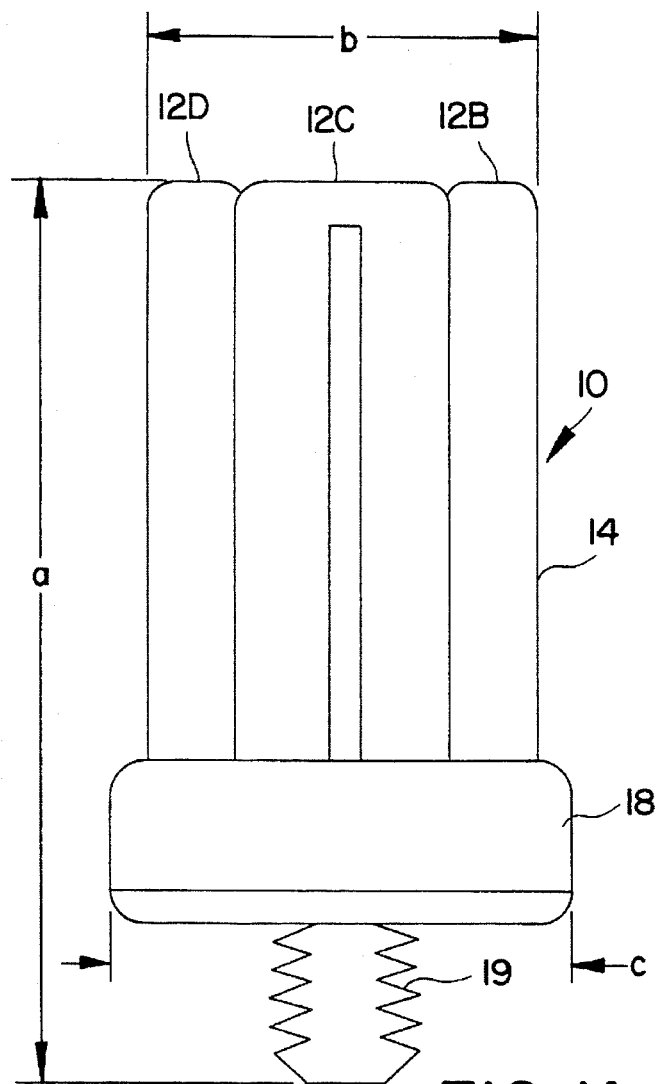
FIGS. 1A and 1B are side and top views of a preferred embodiment of the invention.
Figure 1B:
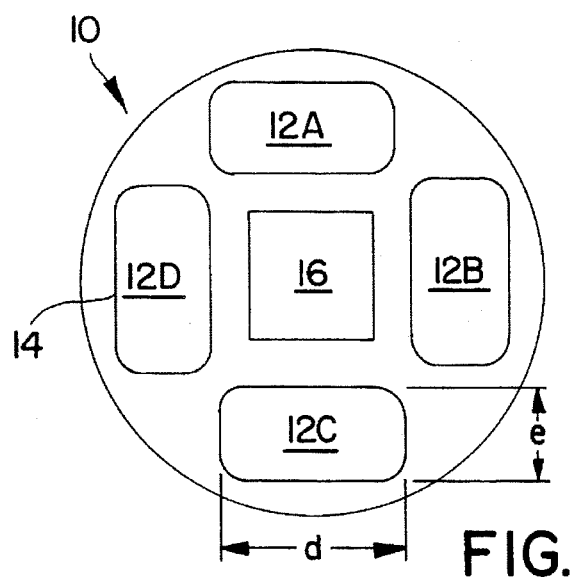

FIGS. 1A–1B show a light source 10 which contains four U tubes 12A, 12B, 12C, 12D arranged in a rectangular fashion. Note however that the whole light source is a single arc tube 14 with arc carrying conduits bridging distinct segments (vertical in FIG. 1A) thereof. In other words there are only two cathodes, one at each end. Typically, this light source which has been disclosed in U.S. Pat. No. 5,345,142, [4] contains an electronic ballast underneath which makes the length quite long. The particular dimensions of such a light source are 180 mm in length and 58 mm in width. In the present configuration (FIGS. 1A–1B) it is shown that the electronic ballast 16 is inserted centrally. Typical overall light source length (a) can be 140 mm, lamp width (b) 50 mm, and base width (c) 62 mm. Dimensions (d) and (e) can be 26.5 mm and 12.5 mm respectively. The ballast can be an elongated tube of round or rectangular or other form. The ballast tube can be e.g. 24 mm by 24 mm. A base 18 (typically of 55 mm diameter) is provided for supporting the U-form lamp section and central ballast and a socket insertable item 19 extends from the base. Further details of this particular configuration in the preferred embodiment are given below.

[4] L. P. Chamberlain, M. Hargitai, F. Lantos, J. Toke and I. Wursching "Single Ended Low Pressure Discharge Lamp" U.S. Pat. No. 5,345,142

Figure 2:
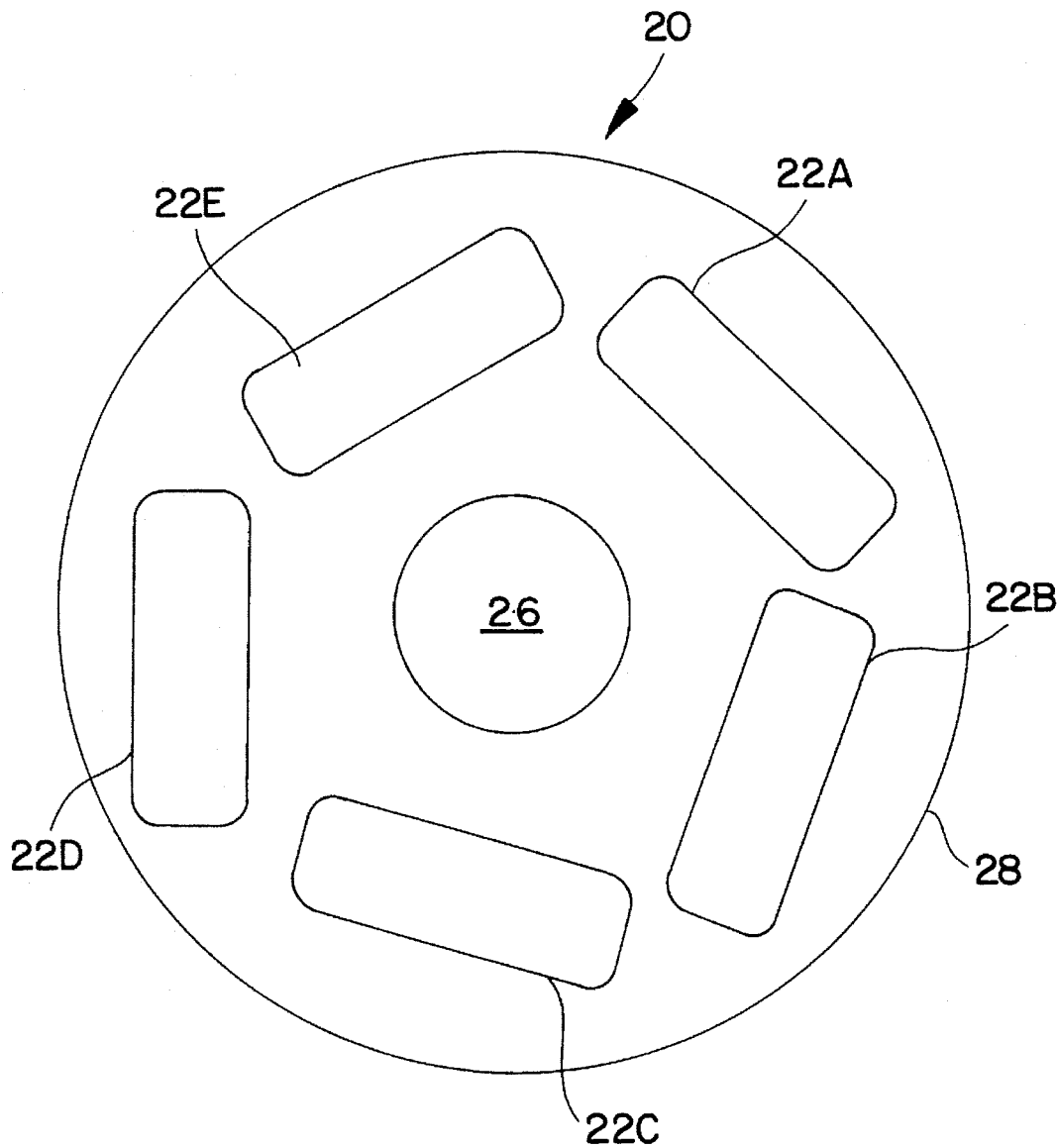
FIG. 2 is a top view of another preferred embodiment.

FIG. 2 shows another embodiment 20; this time with five U shaped arc tubes 22A, 22B, 22C, 22D, 22E and a cylindrical housing 26 which is placed in the center for the ballast tube all on a base 28. The housing is painted with infrared and visible light reflecting paint. The objective of the visible reflecting paint is to reflect the visible radiation so that the system efficiency is optimized. Reflecting infrared radiation minimizes heat transfer from the light source to the ballast so that the electronics in the center of the ballast housing remain cool.

FIGS. 3A, 3B show a separated, detached ballast housing 36-1 which contains all the electronics with two pins and FIGS. 4A, 4B show a ballast 36-2 with four pins. The ability to use two or four pin versions offers flexibility and convenience for the end user. The internal reflective coating of each is indicated at C. The ballast housing contains visible and infrared reflecting paint, such as barium sulfate, aluminum oxide, etc.

If useful in practice holes H can be provided at ends of the ballast housing for further dissipation of heat. In some instances of practice of the present invention, this artifact will not be necessary.

As can be seen from FIGS. 1A, 1B a so called quad light source, this CFL is composed of a single arc tube which actually has eight legs or four U tubes arranged in a rectangular fashion. As mentioned above, the majority of the time, for an integrated self-ballasted light source, the electronic ballast is typically placed at the bottom which elevates the size of the overall package and makes the light source quite inconvenient and burdensome to screw into incandescent sockets because it is a lot bigger than the incandescent bulb it replaces. It goes without saying that the light source could also have five U legs which makes it even higher lumen output and the diameter would be larger. Under those circumstances, the light source with a ballast underneath becomes quite large and therefore not very practical. Table 1 shows the comparison of the present invention with U.S. Pat. No. 5,345,142 and a 100 watt incandescent bulb. As can be seen from the Table, there is substantial amount of reduction in the height of the present package.

This preferred embodiment was tested by taking a four legged light source and measuring the existing distance and the length of the light source and designing an electronic ballast that would fit into that area comfortably. This ballast is shown in FIG. 3. There are many other configurations of electronic ballasts that could be utilized with this kind of a light source. In this configuration, the bore of the ballast was inserted into a housing which was made out of a thin sheet of Teflon and the bottom was inserted onto the base of the lamp. A major concern at the outset was the temperature distribution and how the components would be effected by this tight space and therefore from the very outset it was decided to reflect a lot of the heat from the light source to the outside world and try to keep the electronic components inside the housing as cool as possible. Table 2 shows some of the temperatures that were measured and as can be seen from the Table the temperatures for most of the critical components were not exceeded in the majority of the cases.

Extensive measurements were made of base-up and base-down operation of the package, for long periods of time, and the maximum obtained temperatures in the majority of the cases did not exceed the allowable limits of the components. This gives assurance that the package could be a practical device. The majority of the measurements were done at 25° C. ambient temperature although in some cases they were done at 40° C. ambient temperature to measure the component temperatures as well as the operation of the package. Again, the results are shown in Table 2.

If these ambient temperatures are to be exceeded, it is advisable, as mentioned above, to have a perforated housing which could let air circulate more easily and therefore reduce the temperatures to which the components are exposed. Housings of that sort, with perforated holes, were in fact built and that seems to have reduced the temperature of the components when the ambient temperature exceeded 40° C. In addition to those skilled in the art will recognize that a chimney effect could be utilized to an advantage whereby the base of the lamp could be perforated as well. Under those circumstances, air could circulate from the bottom of the bulb and through the electronic components and go up the top in a base down configuration, and vice versa in a base up configuration. This also has been implemented and a substantial amount of reduction in heat in the components was observed.

Table 3 gives photometric measurements of the package for base up and base down operation. As can be seen, the high lumen output of the bulb was maintained in the base up as well as the base down configuration. In both cases, the bulb was operational for extensive periods of time and therefore over a substantial number of hours no deterioration of the light output was seen. Maintenance curves of the light output with this particular configuration at this point in time are not available; but those skilled in the art could easily obtain those curves.

Spatial light distribution in the present invention is more uniform due to the reflecting and smoothing effect of the ballast housing.

It is within the scope of this invention to change the length of the arc tubes, change the number of the U shaped arc tubes that can be put together as well as to change the lumen output of the package. The same concept could be utilized for light packages anywhere ranging from 300 lumen all the way to over 1000 and it is feasible to go to 2000, 2500, or higher levels. The key of course is to maintain the length of the package as short as possible by introducing the ballast housing inside the arc tube configuration rather than underneath therefore making sure that the diameter and the length of the whole package is close to an incandescent retrofit bulb.

In the preferred embodiment, the ballast housing was painted with barium sulfate paint that had resistance to about 150°–200° C. This paint provided very good reflectivity for visible light as well as for infrared radiation. It is also within the scope of this invention that other paints or other reflectors could be utilized to do similar jobs; e.g., aluminum or aluminum oxide, or other kinds of reflective materials or paints or thin films or other modification of the external surface of the ballast housing to enhance its ability to reflect both the visible as well as the infrared radiation that impinges upon the ballast housing.

It is also within the scope of this invention to utilize less than four U tubes and still put the ballast in the center of the light source, e.g. a ballast housing of rectangular, circular, cylindrical, or triangular shape for a three U tube light source or CFL, or even a two U tube CFL.

As mentioned above, the ballast housing could be made with two pins or four pins. The difference between those two packages is as follows: a two pin approach would mean a lamp containing a starting device inside and utilizing a preheat circuit. However, if four pins are exposed that means that there is no starter in the lamp or ballast housing and therefore one would have to provide that additional capability. That could be done either for a preheat circuit, rapid start or an instant start circuit. Therefore, depending on how the light source is constructed, the ballast housing could have a different number of pins.

Figure 5:
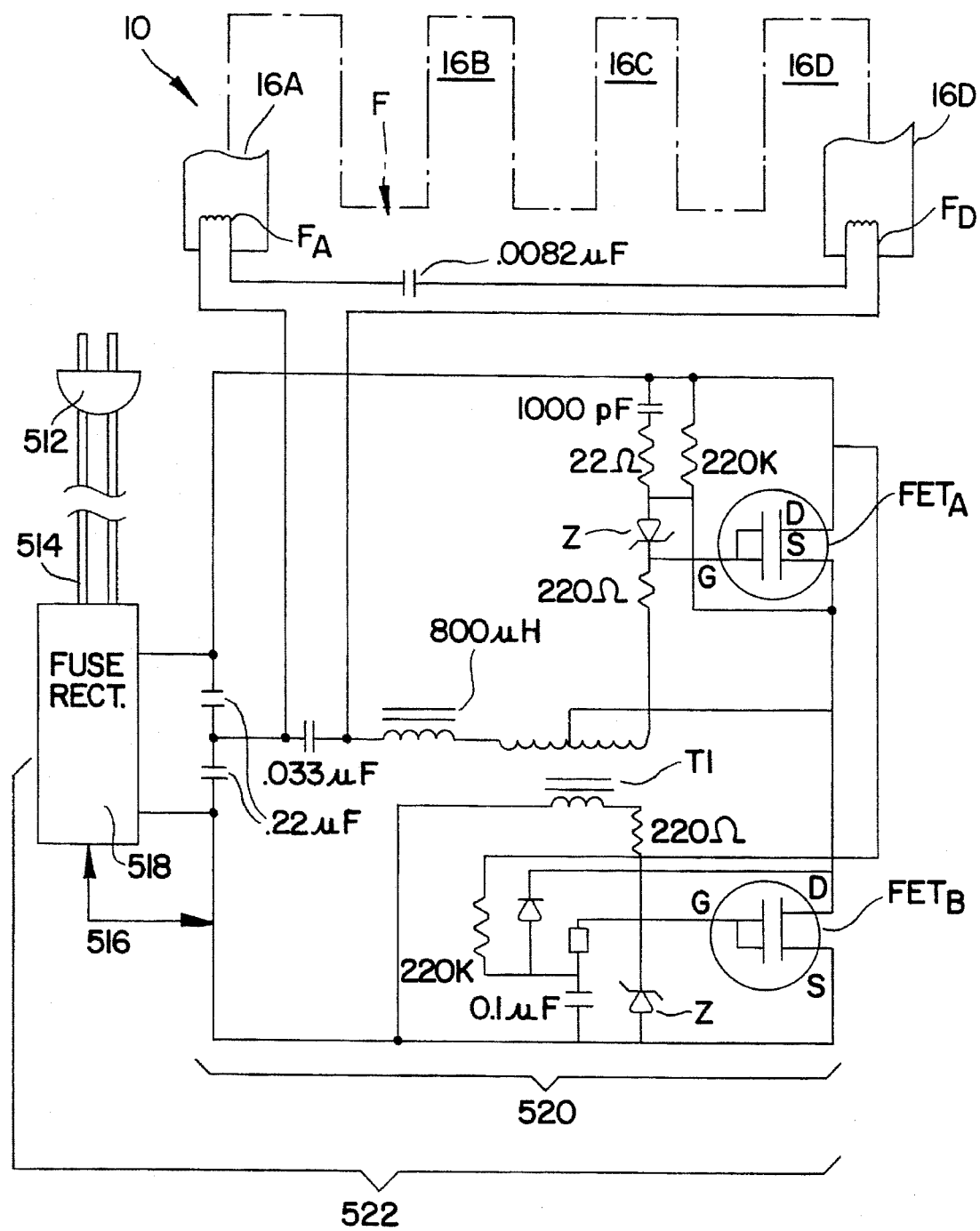
FIG. 5 is a schematic showing of ballast circuit portions.

FIG. 5 indicates the essential elements of a power and ballast system to go with, e.g., the CFL embodiment of FIGS. 1A, 1B with a two pin arrangement of the ballast in an accommodating ballast housing (FIGS. 3A, 3B). The elements are plug 512, power cord 514 (with switching not shown), a ballast circuit 516 (comprising rectifier, fusing and other protective elements, e.g. a varistor all per state-of-the art) and an inverter circuit 520 with field effect transistors (FETA, FETB) and appropriate additional passive components for establishing and maintaining an arc between filaments ($F_A$, $F_B$) at the ends of an elongated serpentine discharge path established by folded U-tubes 16A, 16B, 16C, 16D (FIG. 1A) with glass tube bridging (indicated at E in FIG. 5) between tubes. The FETs may be 16 amp 2,00 V D.C., T0220 (plastic package) devices, the diodes 400 V, 75 V devices in glass or metal packages, the resistors 0.25 watt; metal floor devices, the inductors of millihenry or microhenry values are as shown and using ferrite cores. Electrical connections of the FIG. 5 circuitry are made to the minimum extent necessary via the base 18 and stem 19 (FIG. 1) in the manner well known in the art.

The ballast as a whole is mounted on an elongated printed circuit board of rectangular form which spans the width of the housing 100 and runs for some 50–90% of the length of the housing and spreads the active and passive components out over such board length and width for optimum cooling.

Thus there is provided a new form of arc lamp meeting all the foregoing objects, with the special advantages described herein and further enhancing efficacy of the lamp as a whole, and affording more uniform light distribution compared to conventional ballast-under designs.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

TABLE 1

| Lamp | Height (mm) | Width (mm) |
| --- | --- | --- |
| CFL (U.S. Pat. No. 5345142) | 180 | 58 |
| Incandescent | 108 | 60 |
| Present CFL Package | 135 | 55 |

Comparison of present CFL package dimensions with incandescent lamp and prior art.

TABLE 2

| Component | Temperature Reached (°C.) Base Up | Max Allowable T (°C.) | Temperature Reached (°C.) Base Down |
| --- | --- | --- | --- |
| Base Socket | 66 | 110 | 32 |
| Middle of PCB | 97 |  | 80 |

TABLE 2-continued

| Component | Temperature Reached (°C.) Base Up | Max Allowable T (°C.) | Temperature Reached (°C.) Base Down |
|---|---|---|---|
| FET Case | 127 | 150 | 130 |
| Middle of Ballast Housing | 102 | | 93 |

Temperatures of various components for base up and base down operation at 25° C. ambient temperature.

TABLE 3

| Orientation | Voltage V | Power W | Lumens lu |
|---|---|---|---|
| bu | 120 | 35.3 | 1457 |
| bu | 100 | 29.6 | 1304 |
| bd | 100 | 28.0 | 1283 |
| bd | 120 | 32.1 | 1446 |

Photometric data for base up (bu) and base down (bd) operation of the present invention CFL.

We claim:

1. A compact arc lamp utilizable as an incandescent retrofit replacement with enhanced output and comprising in combination:

(a) means defining an array of four elongated U-form lamp arc tubes arranged vertically with their U bases at their tops, (b) means defining a screw-in base structure with a lower screw-in base part and an upper plate mounting the lamp tubes in an enclosing array around an elongated central space, (c) means defining an electronic ballast circuit with multiple passive and active solid state electronics circuit components, mounted on a printed circuit board arranged in said central space and extending axially in the elongated central space, (d) means defining an elongated ballast housing surrounding said circuit board and within the arc tube array and extending axially with said board and tube array and constructed and arranged:

(1) to support a cooling effect convective flow therein for escape of heat from the electronic ballast; and (2) to reflect heat and light from the arc tubes to limit heat penetration of the central space.

2. The lamp of claim 1 as connected to a lower socket in a base down configuration in and constructed and arranged for chimney effect within the central space.

3. The lamp of claim 1 wherein the tubes are capable of operation at different illumination levels.

4. The lamp of claim 1 wherein the ballast housing contains an external surface which is reflective to radiation in the infrared and visible ranges to keep the components cool and increase the total efficacy of the lamp as a whole.

5. The lamp of claim 1 constructed and arranged through use of said elongated ballast housing so that the total spatial light distribution around the lamp is more uniform than if the ballast housing were underneath the arc tube.

* * * * *